Dec. 26, 1944.   R. W. HENRY   2,366,028
ISOMERIZATION OF HYDROCARBONS
Filed Dec. 7, 1943
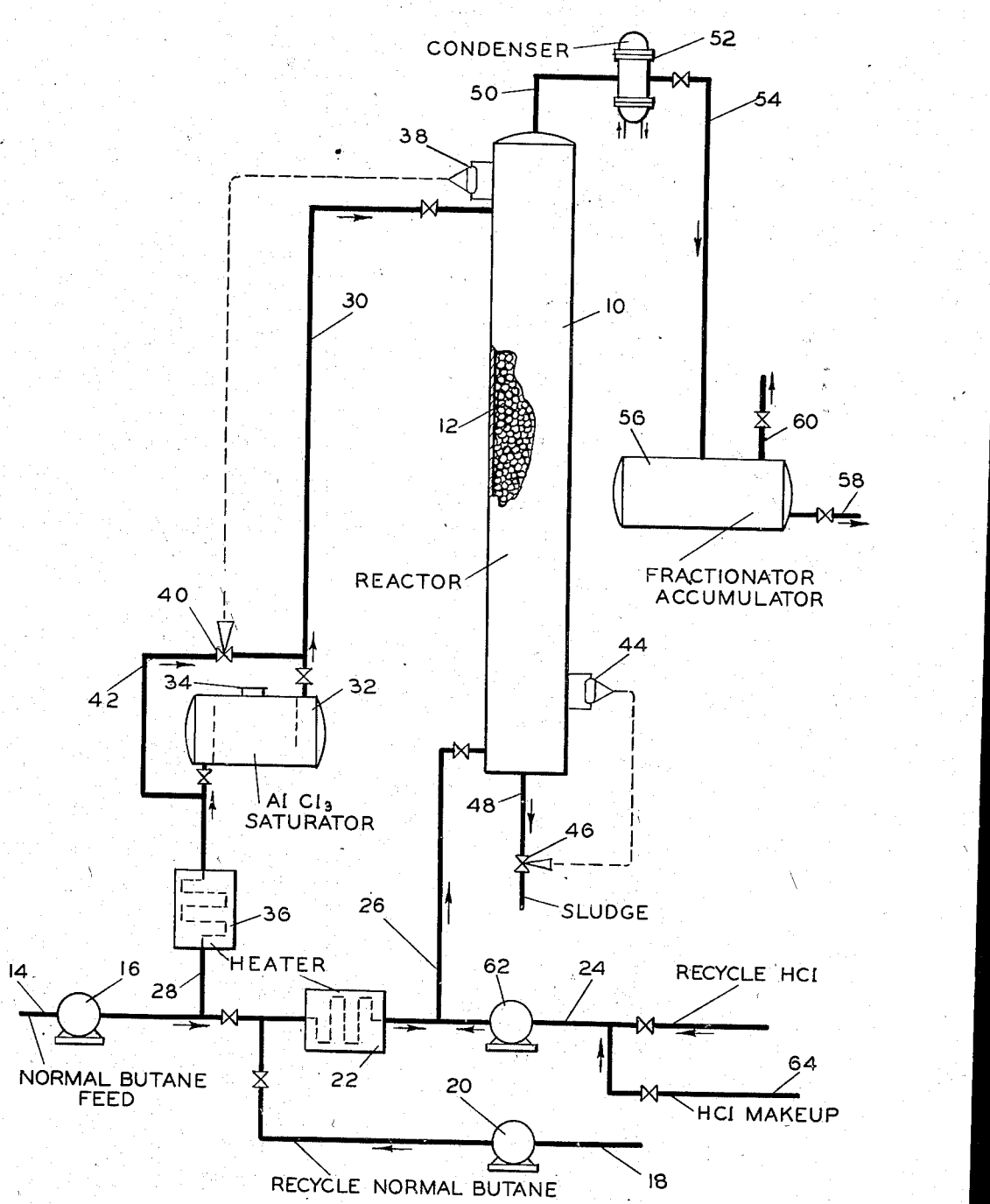
INVENTOR
R. W. HENRY
BY Hudson, Young, + Yinger
ATTORNEYS Patented Dec. 26, 1944

2,366,028

UNITED STATES PATENT OFFICE 2,366,028

ISOMERIZATION OF HYDROCARBONS

Robert W. Henry, Bartlesville, Okla., assignor to Phillips Petroleum Company, a corporation of Delaware Application December 7, 1943, Serial No. 513,263

13 Claims. (Cl. 260—683.5)

This invention relates to the isomerization of hydrocarbons. In particular embodiment it relates to the catalytic isomerization of saturated hydrocarbons, such as paraffins and naphthenes, in mixed liquid and vapor phases. A preferred modification of the invention relates to the conversion of normal butane to isobutane in the presence of an aluminum chloride isomerization catalyst in a continuous manner wherein countercurrent flow of catalyst and reactants is realized.

The catalytic isomerization of saturated hydrocarbons, particularly the conversion of normal butane to isobutane, has become an important industrial process. Generally used is a Friedel-Crafts type metal halide catalyst, particularly one of the aluminum halides such as aluminum chloride, activated with the corresponding hydrogen halide or a substance such as water or alkyl halide which affords the hydrogen halide under the reaction conditions. Numerous methods of carrying out the reaction have been proposed, but each type of process has its own limitations and difficulties.

One method uses a reaction chamber filled with lump or supported aluminum chloride catalyst, and when the catalyst becomes spent it is replenished with fresh catalyst. This intermittent type of operation may be given continuity by the provision of a plurality of chambers interconnected so as to allow diverting the flow of reactants away from one chamber and continuing the flow through another. This, however, requires an excessive number of chambers, piping, valves, etc. Furthermore, in any fixed-bed type of operation the catalyst is unevenly utilized, that is, that portion nearest the feed inlet is used to the point of exhaustion before full use is made of the remainder of the bed. Inasmuch as the isomerization of normal butane to isobutane is an exothermic reaction, it is quite difficult to control temperatures within large-diameter beds, while it is inordinately expensive to utilize small tubes surrounded by a heat exchange medium. Hot spots which invariably develop in a fixed bed cause a very rapid spending of catalyst at such spots, particularly in vapor-phase operations.

Another type of isomerization process involves the intimate contacting of reactants with a liquid sludge-type catalyst. Such a sludge is usually made by suspending the metal halide in and/or reacting it with hydrocarbons or other organic materials. The contacting of sludge with reactants is usually carried out by mechanical agitators which effect a very vigorous mixing of sludge and reactant hydrocarbons which are most often in the liquid phase. In addition to the type of sludge just described, fluid melts of aluminum chloride with alkali metal chlorides and the like, and solutions of aluminum chloride in inorganic salts such as antimony trichloride, have been used in a similar manner. This type of operation involves a rapid motion of catalyst through the equipment, and very severe erosion and corrosion are almost invariably encountered. It is difficult in such operations to obtain effective utilization of the total catalytic activity. Added to the liberated heat of the isomerization reaction is the mechanical heat of agitation, which increases the load on the cooling system. Furthermore, a high power cost is encountered in operating the agitators.

One of the principal difficulties encountered in the practice of isomerization by any of the above methods is the loss of catalyst from the reaction zone. Aluminum chloride and other metal halide isomerization catalysts are somewhat volatile and also are appreciably soluble in liquid hydrocarbons. Hence, when isomerization is effected in the vapor phase, the aluminum chloride or other catalyst sublimes and is carried out in the vaporous effluents, depositing in subsequent cooler portions of the equipment. When isomerization is effected in the liquid phase, the catalyst is carried out dissolved in the liquid effluents, and deposits in subsequent cooler parts of the system. Many attempts have been made to overcome this difficulty but with only incomplete success.

The isomerizations with which this invention is concerned are equilibrium reactions; that is, at a given temperature the percentage of each of the individual isomers in a mixture of isomers is fixed if equilibrium is attained. For example, if either pure normal butane or pure isobutane be contacted with a suitable catalyst, such as aluminum chloride, under given temperature and pressure conditions permitting the reaction to proceed but preferably avoiding side reactions such as cracking, after a period of time an equilibrium mixture of normal and isobutane will be formed. In this mixture, the percentage of isobutane will be the same regardless of whether the charging stock was isobutane or normal butane. This means that in isomerizing normal butane to produce isobutane, there is a maximum conversion obtainable at any given temperature. The lower temperatures give the greatest conversion, but too low a temperature cannot be used because the reaction rate will decrease to an uneconomic level. On the other hand, higher temperatures give higher reaction rates, but the equilibrium mixture contains less isobutane. Furthermore, excessively high temperatures promote undesired side reactions, particularly cracking. As the reaction mixture approaches equilibrium the rate of reaction is retarded. Accordingly, it is ordinarily inefficient to approach equilibrium conversion in a single-pass isomerization.

It is an important object of the present invention to effect the isomerization of isomerizable saturated hydrocarbons in a manner overcoming most or all of the above-mentioned difficulties. It is another object of this invention to isomerize normal paraffins to produce branched-chain paraffins in the presence of an activated Friedel-Crafts type metal halide catalyst. A further object is to isomerize isomerizable naphthenic hydrocarbons. Another object is to isomerize paraffinic hydrocarbons having at least four carbon atoms per molecule. Yet another object is to subject a narrow-boiling range mixture of hydrocarbons to a catalytic isomerization to effect conversion of one or more hydrocarbons to one or more isomeric forms. Another object is to carry out isomerization continuously with the flow of catalyst countercurrent to the flow of reactants. A still further object is to employ isomerization conditions such that the reaction mixture is in mixed liquid and vapor phases. Another object is to provide an increasing temperature gradient in the direction of flow of isomerization catalyst. Still another object is to contact fresh hydrocarbon feed with the least active isomerization catalyst, and to contact the reaction mixture with fresh catalyst at a time when the hydrocarbon has undergone the greatest conversion. A further object is to withdraw vapors containing isomerized hydrocarbons but containing very little or no catalyst. Further objects and advantages of the invention will be apparent, to one skilled in the art, from the accompanying disclosure and description.

The foregoing and other objects are attained in the practice of this invention by a novel method of operating, a preferred modification of which may be described as follows, with special reference by way of example to the isomerization of normal butane to isobutane in the presence of aluminum chloride and hydrogen chloride. The accompanying drawing shows in somewhat diagrammatic form one preferred arrangement of apparatus elements suitable for carrying out the process of the invention. It will be appreciated that not all elements of auxiliary equipment required for optimum operation, such as temperature controllers, etc., are shown, since these elements are readily supplied by one skilled in the art.

In the preferred embodiment, a tall vertical reaction tower 10 is packed with particles of a solid catalyst-supporting material or carrier agent 12, such as carbon Raschig rings, of such a nature as to have a high "wettability" by catalyst sludge, thus providing a large hold-up of catalyst. This packing material is ordinarily substantially inert with respect to reactants and catalyst, examples being Raschig rings, Berl saddles, etc. made from carbon, glazed or unglazed porcelain or other ceramic ware, etc. Rocks or the like of suitable particle size may also be used. It is further within the scope of the invention to utilize as packing preformed or crushed and sized bauxite, activated alumina, fuller's earth, silica gel, etc. which may have merely adsorptive properties or which may, in addition to providing an extended surface for promoting contact of catalyst and reactants, also actually enhance the activity of the catalyst.

The normal butane to be converted, dried by means not shown, enters through line 14 and pump 16, and is joined by unconverted normal butane recycled from the product fractionators via line 18 and pump 20. The combined feed passes through heater 22 wherein it is brought to the desired temperature, generally within the range of 200–250° F., although isomerization temperatures outside this range may also be used. The heated feed, now partly or entirely vaporized, but in any case near its dew-point, is joined by a hydrogen chloride-containing stream entering through line 24, and the mixture introduced via line 26 into the bottom of reactor 10 through a distributing spider (not shown) for passage upward into a column of boiling hydrocarbons containing catalyst. The exothermic isomerization reaction supplies additional heat to the system which is balanced by (1) radiation losses from the reactor, (2) quenching effect caused by evaporation of liquid butane introduced at the top of the reactor via line 30 from the $AlCl_3$ saturator and level-controlling streams as described more fully below, and (3) evaporation of liquid butane introduced in the feed stream 26. The streams entering the reactor are so controlled that the body of hydrocarbon liquid in the reactor is always boiling. This will be discussed more fully below.

A small portion of the feed liquid normal butane, or liquid isobutane from the product separators, if desired, is by-passed via lines 28 and 30 through an aluminum chloride saturator 32 to the top of the reactor. This stream dissolves aluminum chloride from the saturator and carries the same into the top of the reactor to provide continuously a fresh catalyst make-up in necessary amounts. Saturator 32 is periodically charged with aluminum chloride in lump or other form through manhole 34. A heater 36 is interposed in line 28 to bring the liquid stream to the desired temperature. This saturator stream is preferably dry and free from HCl. A level of boiling butane is maintained near the top of the reactor, preferably with the aid of a level controlling device 38 which may actuate a motor valve 40 on a second line 42 carrying a by-passed liquid butane (or isobutane) stream. This second, level controlling stream is introduced via line 42 into the first by-passed or saturator stream in line 30 at a point near that at which the latter leaves the $AlCl_3$ saturator 34, and in this way serves to dilute the latter and thus avoid any deposition of aluminum chloride from the saturator stream which might otherwise occur due to cooling of a saturated butane solution of aluminum chloride. The combined streams to the top of the reactor enter via line 30 as liquid at substantially the temperature of the top of the reactor, or only slightly below, in order to avoid undue cooling. Fresh aluminum chloride catalyst dissolved in the liquid butane is partly precipitated inside the reactor by the boiling off of the butane and partly remains dissolved in the liquid butanes. A portion of the free solid aluminum chloride precipitated at the top of the reactor is deposited on the Raschig rings or other packing 12, while a portion remains suspended in the boiling butanes. The aluminum chloride gradually forms a liquid sludge, which probably comprises aluminum chloride-hydrocarbon complexes having some free aluminum chloride dissolved therein, and this sludge slowly flows down over the packing 12 countercurrent to the ascending stream of butane vapors and liquid, becoming more and more spent as it approaches the bottom of the reactor. The sludge also becomes less viscous toward the lower part of the reactor due to the higher temperatures encountered there and to its decreased content of aluminum chloride. A liquid level of the sludge is preferably maintained in the bottom of reactor 10 at a point above the level of inlet pipe 26, by means such as liquid level controller 44 which controls valve 46 in sludge drain line 48. This body of sludge serves to effect a final and more complete spending of the catalytic activity of the sludge, and also serves to remove any catalyst poisons, such as carbon monoxide, pentanes, water, organic sulfur compounds and/or hydrogen sulfide, etc., which may be in the feed stream. The volume of sludge maintained as a body in the bottom of the reactor has been found to be best maintained at a value ranging between about one-tenth ($\frac{1}{10}$) and about one-half ($\frac{1}{2}$) the total volume of the packed section of the reactor, with one-fourth ($\frac{1}{4}$) being ordinarily satisfactory. Spent sludge is finally withdrawn continuously or intermittently and sent to waste, to other utilization, or to an aluminum chloride recovery process as is expedient.

As heat is supplied to the system by the exothermic isomerization reaction and in some cases by the feed stream, the liquid boils and butane is evaporated. The resulting vapors pass up through the liquid in the reactor in contact with the catalyst and are taken off overhead via line 50. Reactor design is such that the vapors will flow in turbulent fashion up the tower to improve contacting between catalyst, HCl, and liquid and vaporous butanes. The reaction is believed to take place mostly in the liquid phase, although there is also some conversion of the vapors. Isobutane, being somewhat lower boiling than normal butane, is vaporized preferentially, and thus tends to be removed from the zone of reaction as formed, encouraging the conversion by mass action effect. Furthermore, the isobutane content of the reactor is higher in the upper portions due to the selective concentration of isobutane in the up-flowing vapors. Operating in accordance with the invention provides the fresh, most active catalyst at the level of highest isobutane content. This serves to overcome, in part at least, the depression of reaction rate normally occurring upon the approach of equilibrium. Thus there is an increasing isobutane concentration gradient in the direction of flow of reactants, and also a corresponding increasing catalyst activity gradient in the same direction. It is accordingly possible to allow a sufficiently long time of contact in the reactor as to approach equilibrium fairly closely.

A particular advantage is obtained in the present method of operating in view of the fact that a tall vertical column of liquid is maintained in a boiling condition. Due to the static head of liquid, the pressure at the bottom is considerably greater than that at the top. This, coupled with the differences in hydrocarbon composition (the material at the bottom has a higher normal boiling point than that at the top), means that the bottom temperatures are considerably higher than the top temperatures. Thus, an increasing temperature gradient exists in the direction of flow of catalyst, which ensures optimum utilization of available catalytic activity. Fresh catalyst is used at a relatively low temperature, which gives maximum catalyst life, while relatively spent catalyst is used at higher temperatures at which it still exhibits some activity.

Inasmuch as heat is continuously liberated throughout the reactor by the exothermic isomerization, the entire body of liquid is kept in boiling condition. There is no possibility for the development of "hot spots," for any unusual amount of heat liberated having a tendency toward increasing the temperature at any point is immediately absorbed as latent heat of vaporization. Butane vapors introduced at or near their dew point at the bottom of the reactor pass upwardly through the body of liquid butane. A series of condensations and revaporizations occurs so that a substantial rectification effect is obtained, resulting in the enrichment of the vapors with isobutane and enrichment of the liquid with normal butane. The packed column thus acts to a certain extent as a fractional distillation column. It is of course preferred to pass as large a proportion of butane feed as possible into the bottom of the column so that it may pass through the entire length of the reactor. For this reason, the by-passed streams passing through line 30 are held at as low a volume as is possible consistent with the functions of these streams. The volume of liquid butane passing through saturator 32 is controlled to admit the desired amount of catalyst to the reactor. The solubility of AlCl₃ in liquid butane appears to be a logarithmic function of the temperature so that the saturator is held at a temperature approaching the reactor top temperature so as to minimize the amount of butane needed as solvent. It is undesirable to introduce this stream into the reactor at a temperature above that of the reactor because the immediate flashing which would occur would cause deposition of AlCl₃ in the orifices of the inlet and clog the same. Accordingly, there is an upper limit to the temperature of the saturator stream. The quantity of the level-controlling stream which by-passes the saturator through line 42 and is controlled by valve 40 is maintained just great enough to provide adequate control of the reactor liquid level under expected extremes in operation. The principal control by which sufficient liquid is introduced into reactor 10 to absorb the heat of reaction as heat of vaporization lies in the operation of heater 22 which vaporizes part or all of the butane feed as required. Usually this heater is operated to vaporize a major portion of the butane feed. A sufficient, constant amount of liquid butane remains to absorb most of the heat of reaction, while the small stream of liquid butane entering the top via line 30 absorbs the remainder. Of course any superheating of feed over the reactor temperature is also absorbed by evaporation of liquid in the reactor. Some heat is of course lost by radiation, and some is carried out in the effluent vapors. Variations in heat input or production in the column tend to lower or raise the liquid level, and this tendency is automatically counteracted by variations in the amount of flow through valve 40. For example, a system which has a bottom feed inlet of 3000 barrels butane per day (partially vaporized) is designed for the passage of 250 barrels liquid butane per day through saturator 32 and 250 additional barrels liquid butane per day through by-pass line 42 and valve 40. However, in operation a total flow of 300, rather than 500, barrels per day is ordinarily adequate. This amounts to about 10 per cent of the bottom feed stream.

From the foregoing description it will be seen that the reactor contains a body of liquid through which vapors introduced at the bottom and formed in the reactor are continuously bubbling. The vapors and liquid are at all points in equilibrium, with condensation and revaporization occurring. The liquid circulates within the zone, and normal butane introduced at the top flows downwardly at least partially toward the bottom. It is desirable to avoid any operation which would dry up the lower portion of the packing. This could be caused by introducing vapors at the bottom at a temperature appreciably above their dew-point without providing for adequate cooling or liquid input in some other manner. There is a limit to the amount of liquid or cooling which could be provided at the top without "flooding" the column. Drying up of the bottom packing could also be caused by too high a rate of input of the bottom feed vapors, which would lift the liquid in the column and cause "flooding" in the upper portion. On the other hand, it has been found that too low a bottom feed rate reduces the percentage conversion, due probably to the fact that inadequate agitation and sludge hold-up are obtained. A fairly rapid upflow of vapors through the packing aids materially in holding catalyst sludge to a slow rate of run-down, thus ensuring the utilization of most of its catalytic activity. In the case of a column packed with ¾" to 1" Raschig rings, a bottom feed inlet rate is maintained which would produce, if the column were free from liquid, a linear vapor velocity preferably of at least about 0.1 foot per second, and more desirably ranging up to about 0.2 foot per second or somewhat higher. It has been found that a feed rate of about 80 to 110 barrels butane per day per square foot of reactor cross-section gives adequate sludge hold-up without flooding.

The pressure on reactor 10 is maintained so as to keep liquid butanes in the reactor at desired isomerization temperatures, preferably within the range of about 200 to about 250° F., and so as to release vapors from the top substantially at their dew point. The effluent vapors contain little or no aluminum chloride because of the pressure on the system and primarily because of the solvent power for aluminum chloride of the liquid butanes which are held in the reactor. The vaporous effluents pass via line 50, condenser 52 and line 54 to an accumulator tank 56, from which the condensate is passed via line 58 to further treatment or to conventional fractionation and/or other separation means, which are not shown in the drawing for the sake of simplicity. Small amounts of light gases may be bled off from tank 56 through line 60 in order to avoid undue accumulation or pyramiding thereof in the system. The material passing through line 58 is preferably passed to a fractionating column (not shown) of about 20 or more plates which may be operated by refluxing in conventional manner, or as a stripper by passing the liquid feed to a high point in the column without further reflux. In any case an overhead product is obtained comprising substantially all of the hydrogen chloride, and which may also contain some light gases such as propane, ethane, hydrogen, etc. formed by side reactions in the conversion or added to the feed material. It will be understood that various modifications, such as the use of limited amounts of hydrogen in the feed to minimize cracking and catalyst deterioration, and other expedients known to the art, may be utilized in conjunction with the practice of my invention without departing therefrom. The overhead product obtained from the HCl fractionator is recycled to the reactor via line 24, using a pump, or compressor, 62 if required. Makeup hydrogen chloride is added to the system through line 64. The bottom product from the HCl fractionator is caustic washed and then passed to a fractionator from which the isobutane product is recovered as an overhead fraction, while the kettle product comprising unconverted normal butane is recycled to the reactor via line 18, using pump 20 if required. A part or all of this stream may be fractionated to remove small amounts of pentanes and heavier formed during the conversion, so that the pentane content of the reactor feed is maintained at a low value, preferably below one per cent.

The following data are offered by way of example to show results obtained by operating in accordance with my invention. It will be appreciated that this example is not to be construed as unduly limiting the invention or as representing the best possible results obtainable therefrom. Normal butane was isomerized in a plant constructed substantially in accordance with the drawing and operated as described above. The reactor was packed with ¾" carbon Raschig rings. In the subjoined table are tabulated the conditions prevailing during a period of five weeks' continuous operation.

| | |
|---|---|
| HCl concentration in bottoms feed | 6 mol percent |
| AlCl₃ (free and combined) concentration in reactor | 15–19 lb./cubic ft. reactor vol. |
| Top reactor temperature | 205–210° F. |
| Bottom reactor temperature | 220–225° F. |
| Top reactor pressure | 240–245 lb./sq. inch gage |
| Bottom feed rate | 85–96 bbls./day/sq. ft. reactor crosssection |
| Average conversion to isobutane | 39 liquid vol. percent |
| Average conversion to propane | 1 liquid vol. percent |
| Average conversion to pentanes plus | 1 liquid vol. percent |
| Catalyst life | 0.71 lb./bbl./isobutane produced |

The principles of the present invention may be applied by suitable modification to the isomerization of pure hydrocarbons such as normal pentane, normal hexane, 2-methyl pentane, normal octane, etc., and also to the isomerization of mixed feeds such as normally liquid hydrocarbon fractions containing a plurality of individual saturated hydrocarbons. Preferably such fractions are of relatively narrow boiling range in order to avoid an undue concentration of the heavier components in the liquid reaction mixture. It will be appreciated that optimum temperature ranges for the isomerization of any given feed will readily be determined by one skilled in the art, and may not correspond exactly with the range of 200–250° F. which is preferred for normal butane. With any feed stock it is preferred to have a minimum amount of unsaturated or aromatic material present. Not only may normal paraffins be converted to branched-chain paraffins, but also branched-chain paraffins may be converted to their more-branched isomers. The same principles apply to naphthenic compounds. Furthermore, the reverse of these conversions may be carried out, for example the conversion of isobutane to normal butane, although certain advantages, such as the preferential vaporization of the lower boiling isomeric product, would not always be available, and at present such a conversion would seldom be economically advantageous.

Although the invention has been described with particular reference to a specific conversion carried out in a specific and preferred manner, various modifications will occur to one skilled in the art which may be practiced without departing from the scope of the invention as defined in the claims.

I claim:

1. A process for the isomerization of normal butane to produce isobutane which comprises continuously introducing a stream of normal butane containing a catalyst-activating amount of hydrogen chloride into a low point of a reaction zone containing a permeable bed of solid catalyst-supporting material, flowing said stream upwardly through said bed in contact with a downwardly flowing stream of active aluminum chloride catalyst sludge distributed over said catalyst supporting material so as to ensure intimate contact between sludge and butane, maintaining a level of liquid hydrocarbons at a high point of said reaction zone, maintaining said zone at temperatures within the range of about 200 to about 250° F. and under the vapor pressure of the mixture therein, supplying sufficient heat to said zone including exothermic heat of reaction as to ensure boiling of the reaction mixture substantially throughout the body of liquid hydrocarbons, continuously supplying aluminum chloride dissolved in liquid butane to a high point of said bed, withdrawing sludge from a low point in said zone, continuously withdrawing vapors from a point above said liquid level, and recovering isobutane from said vapors.

2. A process for the isomerization of normal butane to produce isobutane which comprises maintaining at isomerization conditions of temperature and pressure a body of liquid hydrocarbons comprising essentially normal and isobutane in contact with an elongated vertical pervious bed of solid carrier agent, introducing aluminum chloride into an upper portion of said bed, maintaining said body of liquid hydrocarbons at isomerization conditions of temperature and pressure such as to effect vaporization of hydrocarbons therein and to cause formation of a liquid catalytically active sludge phase from said aluminum chloride, removing substantially spent sludge from a lower portion of said bed, whereby the catalytic activity decreases in the direction of flow of sludge in said bed, withdrawing vapors from a point above said body of liquid hydrocarbons, and recovering isobutane product from said vapors.

3. A process for the isomerization of isomerizable saturated hydrocarbons which comprises providing within an isomerization zone a body of solid particulate catalyst supporting material of such character as to allow flow of sludge over the particles in said body and passage of vapors upwardly therethrough in intimate contact with liquid therein, introducing a sludge-forming Friedel-Crafts type metal halide catalyst into a high point of said zone, providing an effective amount of catalyst activator throughout said zone, maintaining a body of liquid saturated hydrocarbons within said zone such as to effect substantial immersion of said body of supporting material therein, maintaining temperature and pressure conditions to effect boiling of said saturated hydrocarbons throughout said zone and to effect the desired isomerization in said zone, withdrawing catalyst sludge from a low point of said zone, introducing at least a major proportion of the hydrocarbons to be isomerized into said zone at a low point thereof, and withdrawing saturated hydrocarbons from a high point in said zone comprising desired isomeric hydrocarbons produced by said isomerization.

4. A process for the isomerization of isomerizable saturated hydrocarbons which comprises providing within an isomerization zone a body of solid particulate catalyst supporting material of such character as to allow flow of sludge over the particles in said body and passage of vapors upwardly therethrough in intimate contact with liquid therein, maintaining a body of liquid saturated hydrocarbons within said zone such as to effect substantial immersion of said body of supporting material therein, introducing a major portion of the isomerizable hydrocarbon feed into a low point of said zone at least partially vaporized and substantially at the dew point, maintaining temperature and pressure conditions such as to ensure an upward flow of dew-point vapors in equilibrium with liquid hydrocarbons substantially throughout said body of liquid and such as to effect the desired isomerization, dissolving a required quantity of isomerization catalyst in a minor portion of the isomerizable hydrocarbon feed in liquid phase and passing the resulting solution into a high point of said zone, said catalyst being a hydrocarbon-soluble metal halide of the Friedel-Crafts type which forms a catalytically active liquid sludge under the conditions prevailing in said zone, withdrawing substantially spent sludge from a low point in said zone after downward flow thereof through said body of catalyst supporting material, providing an effective amount of catalyst activator throughout said zone, introducing a minor portion of the isomerizable hydrocarbon feed in liquid phase into said zone in controlled quantities sufficient to maintain a desired liquid level at a high point in said zone, withdrawing vapors at their dew-point from said zone at a point above said liquid level, and recovering isomerized hydrocarbons from said vapors.

5. The process of claim 4 in which said liquid level is maintained sufficiently high as to provide a column of liquid of such height that the temperature of the boiling liquid at the bottom of said column is substantially higher than the temperature of the boiling liquid at the top of said column in correspondence with the pressure differential caused by the weight of said column of liquid.

6. The process of claim 4 in which a body of liquid catalyst sludge having between about one-tenth and about one-half the volume of said body of catalyst supporting material is maintained below said body of liquid hydrocarbons and at least largely above the point of introduction of said major portion of isomerizable hydrocarbon feed.

7. The process of claim 4 in which said isomerizable hydrocarbon feed is a narrow-boiling normally liquid saturated hydrocarbon fraction.

8. The process of claim 4 in which said isomerizable hydrocarbon feed comprises essentially normal butane.

9. The process of claim 4 in which said catalyst is anhydrous aluminum chloride and said catalyst activator is anhydrous hydrogen chloride.

10. The process of claim 4 in which said zone is maintained at least largely within the range of about 200 to about 250° F.

11. The process of claim 3 in which said isomerizable saturated hydrocarbons comprise essentially normal butane and in which said catalyst is aluminum chloride.

12. A process for the isomerization of normal butane to produce isobutane which comprises maintaining at isomerization conditions of temperature and pressure a body of liquid hydrocarbons comprising essentially normal and isobutane in contact with an elongated vertical pervious bed of solid carrier agent, introducing aluminum chloride into an upper portion of said bed, maintaining said body of liquid hydrocarbons at isomerization conditions of temperature and pressure such as to effect vaporization of hydrocarbons therein and to cause formation of a liquid catalytically active sludge phase from said aluminum chloride and such that an increasing temperature gradient from the upper portion to the lower portion of said bed is maintained, removing substantially spent sludge from a lower portion of said bed, whereby the catalytic activity decreases in the direction of flow of sludge in said bed, withdrawing vapors from a point above said body of liquid hydrocarbons, and recovering isobutane product from said vapors.

13. The process of claim 12 in which said increasing temperature gradient is maintained by maintaining said body of liquid hydrocarbons of sufficient height that the hydrostatic pressure in said column substantially increases the boiling point of the liquid hydrocarbons in the lower portion over the boiling point of the liquid hydrocarbons in the upper portion of said liquid body.

ROBERT W. HENRY.